United States Patent
Johnson et al.

(10) Patent No.: US 10,565,037 B2
(45) Date of Patent: Feb. 18, 2020

(54) DATA UPDATE OF SHARED FABRIC MEMORY IN A HIGH PERFORMANCE COMPUTING SYSTEM

(71) Applicant: Hewlett Packard Enterprise Development LP, Houston, TX (US)

(72) Inventors: Charles Johnson, San Jose, CA (US); Mesut Kuscu, Dornach-Aschheim (DE); Onkar Patil, Raleigh, NC (US); James Hyungsun Park, Palo Alto, CA (US); Harumi Kuno, Cupertino, CA (US); Robert Schreiber, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 11 days.

(21) Appl. No.: 15/847,067

(22) Filed: Dec. 19, 2017

(65) Prior Publication Data
US 2019/0187924 A1   Jun. 20, 2019

(51) Int. Cl.
*G06F 9/54* (2006.01)
*G06F 17/16* (2006.01)

(52) U.S. Cl.
CPC .............. *G06F 9/544* (2013.01); *G06F 17/16* (2013.01)

(58) Field of Classification Search
CPC ................................. G06F 9/544; G06F 17/16
See application file for complete search history.

(56) References Cited

U.S. PATENT DOCUMENTS

| | | | |
|---|---|---|---|
| 2016/0239591 A1 | 8/2016 | Sampath | |
| 2016/0283441 A1* | 9/2016 | Grinberg | G06F 17/16 |
| 2017/0192937 A1* | 7/2017 | Januario | G06F 17/16 |
| 2018/0007302 A1* | 1/2018 | Meixner | G06T 1/20 |

OTHER PUBLICATIONS

Meng et al. "Performance Modeling and Automatic Ghost Zone Optimization for Iterative Stencil Loops on GPUs." Jun. 2009. ACM. ICS '09. pp. 256-265. (Year: 2009).*
Gamell et al. "Exploring Failure Recovery for Stencil-based Applications at Extreme Scales." Jun. 2015. ACM. HPDC '15. pp. 279-282. (Year: 2015).*

(Continued)

*Primary Examiner* — Nathan Sadler
(74) *Attorney, Agent, or Firm* — Hewlett Packard Enterprise Patent Department

(57) ABSTRACT

A high performance computing system that includes a shared fabric memory and a plurality of processors is disclosed. A first processor is coupled to a local storage and executes a first process that, in combination with other processes, causes the plurality of processors to perform certain actions including transferring, from the shared fabric memory to the local storage, a first value corresponding to a first cell of a first set of cells and a first sweep of a stencil code. The actions further include transferring, from a first logical partition in the shared fabric memory associated with the first cell to the local storage, a second value corresponding to a second cell related to the first cell and not in the first set of cells. Further, these actions include updating, by the first process, the first value based on at least the first value and the second value.

20 Claims, 10 Drawing Sheets

(56) References Cited

OTHER PUBLICATIONS

Holewinski et al. "High-Performance Code Generation for Stencil Computations on GPU Architectures." Jun. 2012. ACM. ICS '12. pp. 311-320. (Year: 2012).*

Jean-Baptiste Besnard et al., "An MPI Halo-Cell Implementation for Zero-Copy Abstraction," EuroMPI '15, Sep. 2015, pp. 1-9, ACM.

Jiayuan Meng and Kevin Skadron, "Performance Modeling and Automatic Ghost Zone Optimization for Iterative Stencil Loops on GPUs," Jun. 2009, pp. 1-10, University of Virginia.

Jongsoo Park et at, "Efficient Shared-Memory Implementation of High-performance Conjugate Gradient Benchmark and Its Application to Unstructured Matrices," SC14, Nov. 2014, pp. 1-11, IEEE.

Yonghong Yan et al., "Supporting Multiple Accelerators in High-Level Programming Models," PMAM'15, Feb. 2015, pp. 1-11, ACM.

"A Beginner's Guide to High—Performance Computing," availabe online at <http://www.shodor.org/media/content/petascale/materials/UPModules/beginnersGuideHPC/moduleDocument_pdf.pdf>, 49 pages. Feb. 2014.

Bryan Carpenter, "Ghost Regions", available online at <http://www.hpjava.org/papers/HPJava/HPJava/node28.html>, Apr. 15, 2003, 7 pages.

Nieplocha et al., "Combining Distributed and Shared Memory Models: Approach and Evolution of the Global Arrays Toolkit", Pacific Northwest National Laboratory, available online at <http://www.ece.Isu.edu/jxr/pohll-02/papers/jarek.pdf>, 9 pages, Jul. 2002.

Wikipedia, "Stencil Code", available online at <https://en.wikipedia.org/w/index.php?title=Stencil_code&oldid=788464700>, Jul. 1, 2017, 5 pages.

* cited by examiner

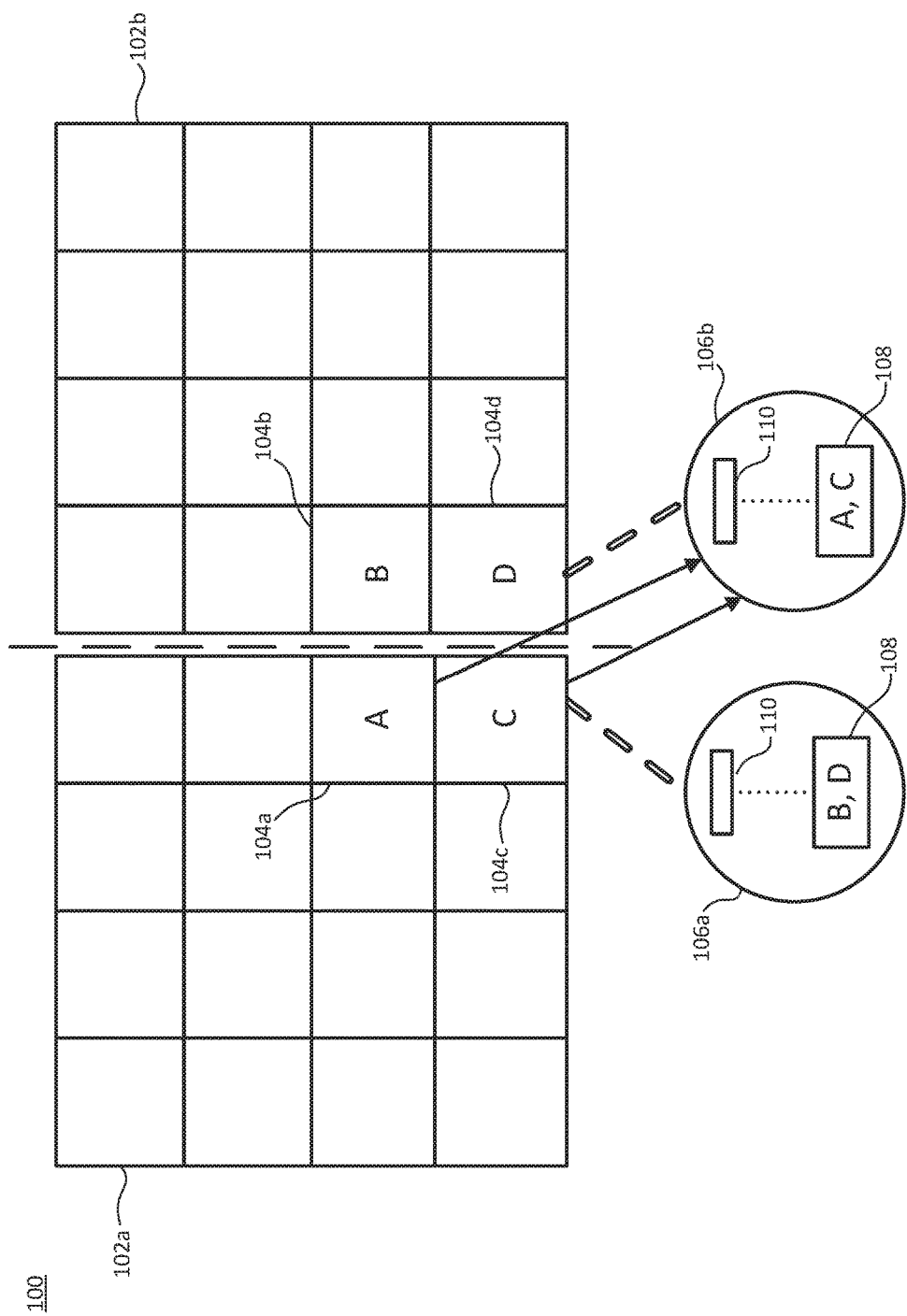

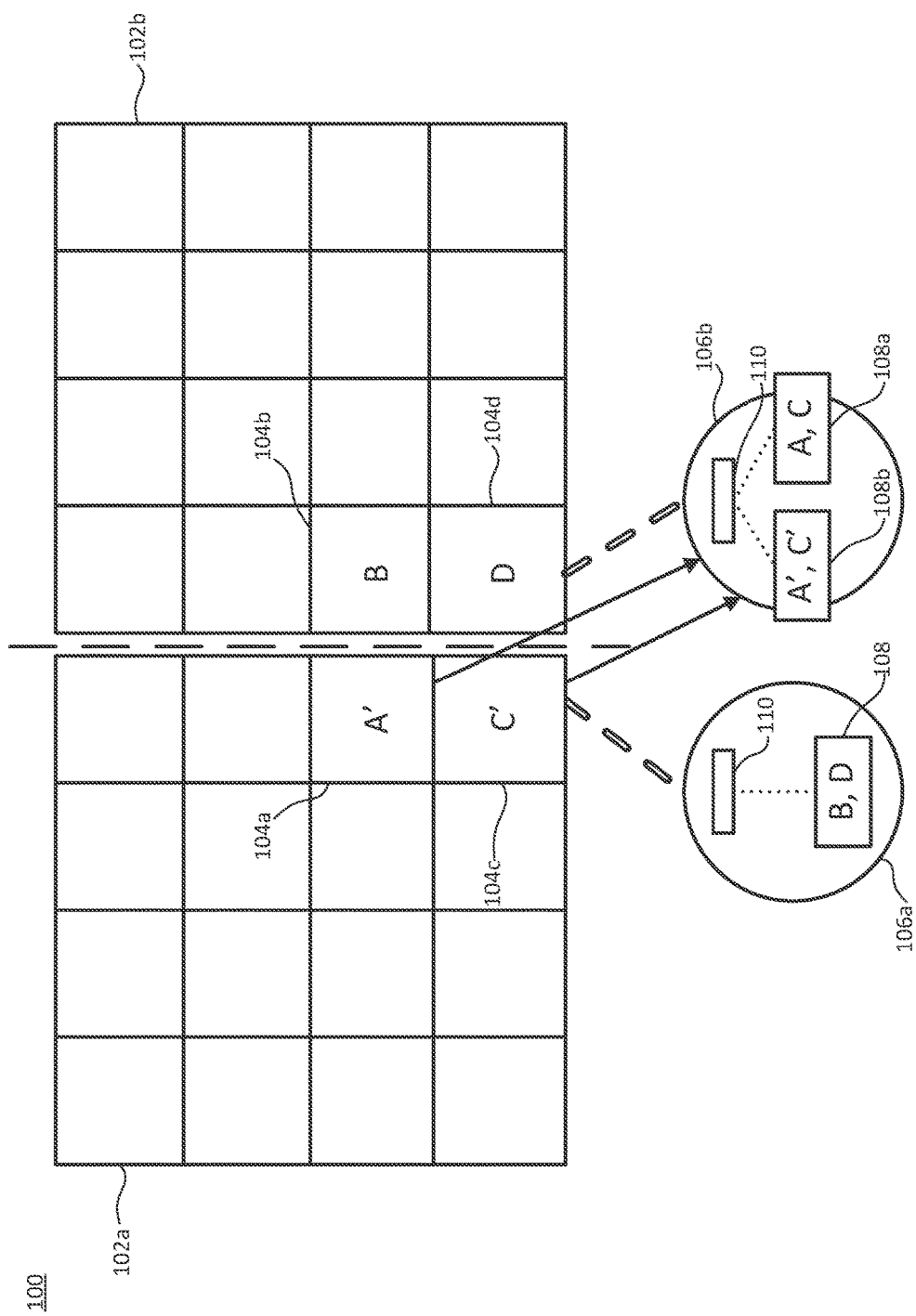

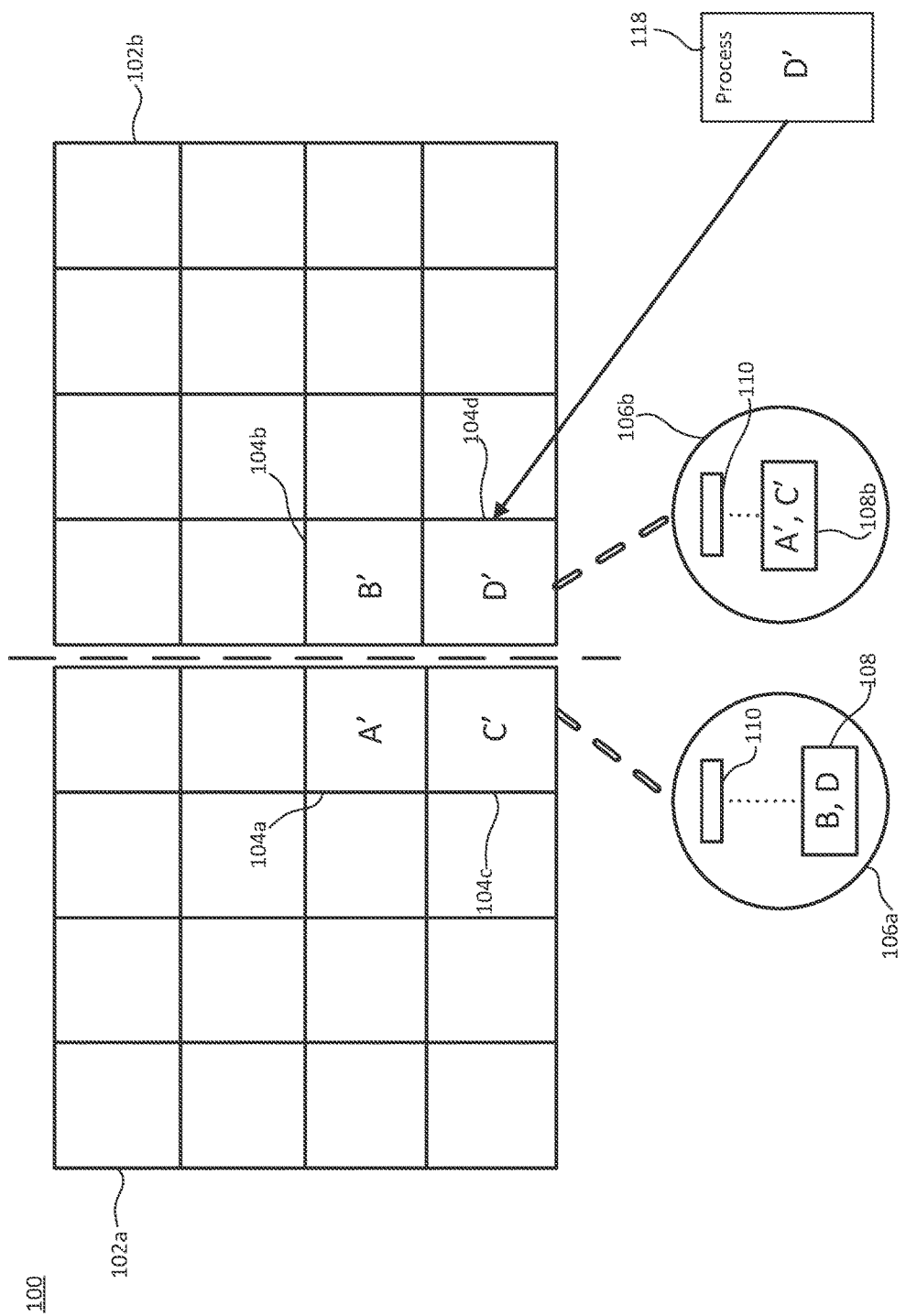

DATA UPDATE OF SHARED FABRIC MEMORY IN A HIGH PERFORMANCE COMPUTING SYSTEM

BACKGROUND

High performance computing (HPC) systems perform operations on large datasets, usually using massively parallel processing capabilities. Often, the large dataset is too large to be operated on at the same time, so portions of the dataset may be operated on in stages. In some applications that are run on HPC systems, certain portions of data are accessed simultaneously and certain other portions of data are accessed sequentially. Values within a portion of data may be related to other values within other portions of data in a way that when an operation is performed on a value, the related values must be retrieved to perform the operation.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which:

FIGS. 1A-1F illustrate an example matrix of cells updated using mailboxes;

Figure 1B:
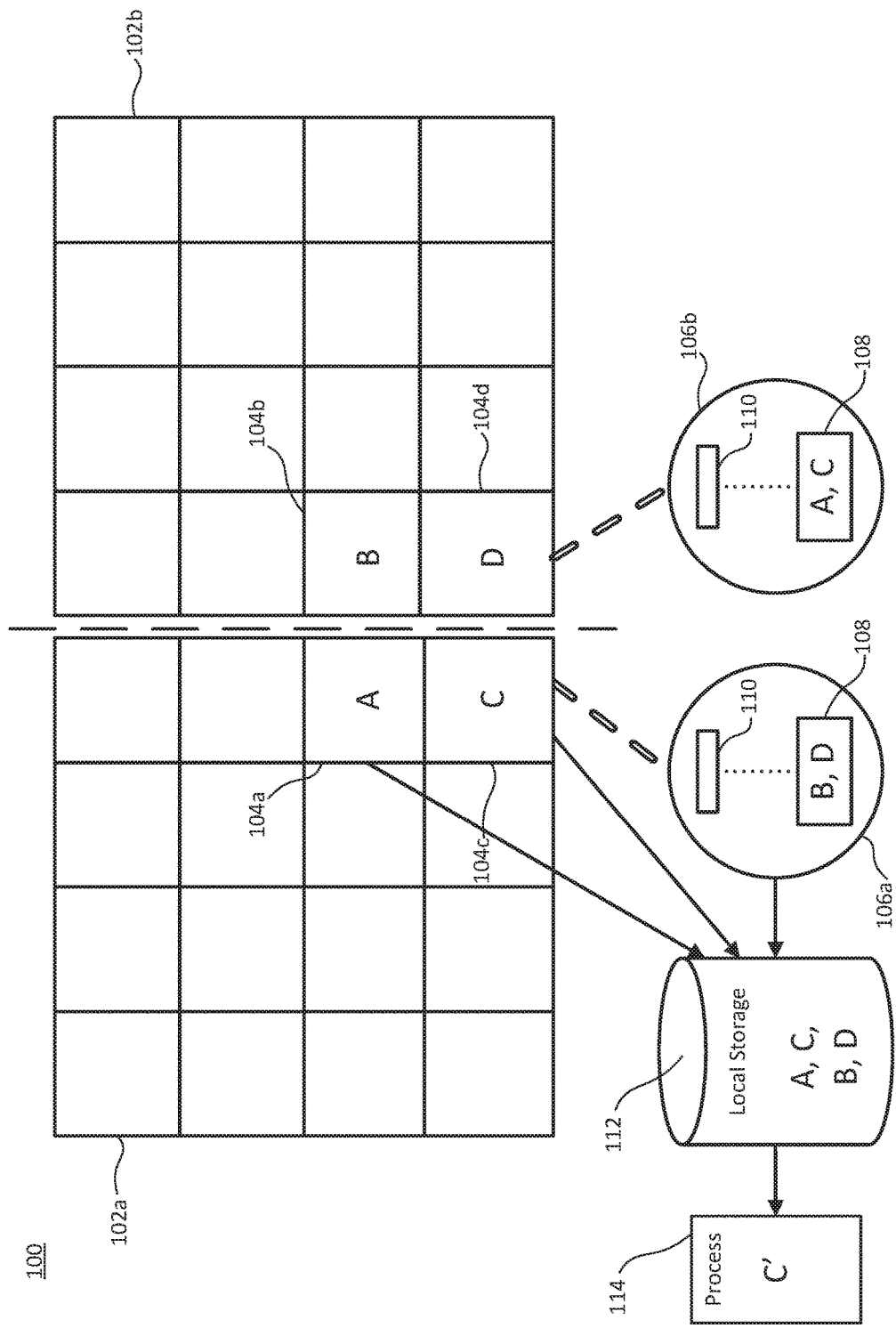

It is appreciated that certain examples described herein have features that are in addition to or in lieu of the features illustrated in the above-referenced figures. Certain labels may be omitted from certain figures for the sake of clarity.

DETAILED DESCRIPTION

In some examples, high performance computing (HPC) systems include a large shared fabric memory and a pool of processors, each coupled to a respective local storage (e.g. cache, RAM). In certain examples, each local storage is used by a single respective processor. In certain other examples, portions of a local storage are used by a single respective processor and other portions of the local storage are shared between multiple processors. The HPC systems may be programmed to execute certain instructions on each value of a large collection of data. For example, the HPC system may execute a stencil code on a large matrix of cells. An example stencil code updates values for each cell of the large matrix during a sweep, which is an iteration of updating all of the values in the matrix (in simulations of physical phenomena, a sweep may be called a timestep, representing the advancement of the simulation from a first time t to a second time t+n; in this disclosure, "sweep" and "timestep" are used interchangeably).

The large matrix is split into a number of subgrids that are small enough to be processed substantially simultaneously by the pool of processors. A first subgrid, for example, is loaded into the local storages of the pool of processors. In some examples, each processor updates a value for a single cell. In some other examples, each processor executes multiple processes, each of which updates a value for a single cell. In yet other examples, each processor executes multiple processes, each of which updates values for multiple cells.

In certain examples, the extremely large amount of data being processed makes traditional data backup and failure resiliency extremely inefficient or impossible. In the case of a crash or a device failure, preservation of the status of the system allows the application to continue from a current or recent point of execution rather than corrupted data being discarded and reloaded from a distantly prior checkpoint.

When an example HPC system is updating a value of a cell from its old value to its new value, the old value of the cell as well as old values from related cells are loaded into local storage to be used in determining the new value. In some examples, the related cells are the cells directly surrounding the cell being updated. When the cell being updated is located near the edge of a subgrid (called the "halo region"), certain of the surrounding cells may be located in other subgrids. Since the subgrid containing the cell being updated is loaded into local storages and the other subgrids containing the surrounding cells are not loaded into the local storages, the old values of the surrounding cells on other subgrids are passed to the local storage to be used in determining the new value of the cell to be updated.

An example HPC system creates logical partitions in the shared fabric memory to store values for used when updating cells in the halo region. Specifically, each logical partition is a mailbox containing packages (i.e. variable-length pieces of data containing values of surrounding cells). The mailbox is logically addressed to a cell in the matrix (but the mailbox may be stored anywhere in the shared fabric memory in relation to its addressed cell). The packages are sent to the mailbox when the subgrids containing the surrounding cells are updated, and the packages are retrieved from the mailbox when the subgrid containing the cell to which the mailbox is addressed is updated. Once the packages containing values from the appropriate timestep are loaded into local memory along with the values from the current subgrid, the process begins determining the new value for the cell to be updated. In some examples, the new value for the cell to be updated is determined by calculating a mean average of the old value of the cell to be updated along with its surrounding cells. In some other examples, the new value for the cell to be updated is determined by calculating a weighted average of the old value of the cell to be updated along with its surrounding cells. The specific algorithm for updating the value of a cell may be any algorithm appropriate to the context.

In an example operation of an example HPC system, the large matrix includes subgrids A and B. Each of subgrids A and B are a two-dimensional, nine-cell square subgrid, and subgrid A abuts subgrid B on the right side of subgrid A and the left side of subgrid B. Each cell is numbered from 1 to 9, starting at the top left of each subgrid, resulting in a matrix as shown in Table 1 below.

TABLE 1

| Example Matrix with Subgrids A and B | | | | | |
|---|---|---|---|---|---|
| A-1 | A-2 | A-3 | B-1 | B-2 | B-3 |
| A-4 | A-5 | A-6 | B-4 | B-5 | B-6 |
| A-7 | A-8 | A-9 | B-7 | B-8 | B-9 |

Referring to the above example, subgrid A is loaded into local storages for sweep 2. The values in the cells are to be updated from sweep 1 to sweep 2. The value of cell A-9 for sweep 1 is loaded into a local storage of a processor, as are the values of surrounding cells A-5, A-6, and A-8 from sweep 1. Then, the values of cells B-4 and B-7 from sweep 1 are retrieved from mailbox A-9 and stored in the local storage of the processor. In some examples, both values from cells B-4 and B-7 are contained in one package stored in mailbox A-9. In some other examples, the value from cell B-4 is contained in one package and the value from cell B-7 is contained in another package.

Again referring to the above example, the processor uses the values of the cells from sweep 1 that are stored in the local storage to determine a sweep 2 value for cell A-9. For example, the processor sums the values of the cells and divides by six (the number of cells) to calculate the mean value of the cells, which is then assigned to cell A-9 as the sweep 2 value. Then, the sweep 2 value is stored in the shared fabric memory in a location allocated for it. The sweep 2 value for cell A-9 is also written to mailboxes B-4 and B-7 for use when subgrid B is updated. In some examples, all of the sweep 2 values for subgrid A are aggregated prior to being written to the shared fabric memory. In certain examples, subgrid A is updated through multiple sweeps (e.g. sweep 1 to sweep 5), and only the latest sweep is written to the shared fabric memory. In such a case, values from multiple sweeps are stored in each mailbox.

In some examples, mailboxes are primed with initial data prior to the first sweep of the matrix. For example, mailbox A-9 may contain the initial values of cells B-4 and B-7 prior to executing the first sweep. In some other examples, mailboxes are populated during the first sweep prior to updating the cell values.

FIGS. 1A-1F illustrate an example matrix containing cells, including cells in halo regions of each subgrid of cells. FIGS. 1A-1F illustrate progression of a sweep of the stencil code through the matrix, including passing values between subgrids using mailboxes.

FIG. 1A illustrates matrix 100 at the start of a sweep. Subgrids 102a and 102b each contain 12 cells, including cells 104a and 104c in subgrid 102a and cells 104b and 104d in subgrid 102b. Each cell has been populated with a value (not shown for unlabeled cells), with cell 104a retaining value "A", cell 104b retaining value "B", cell 104c retaining value "C" and cell 104d retaining value "D." In some examples, the current sweep is the first sweep, and the data in the cells represents initial data. In some other examples, the current sweep is not the first sweep, and the data in the cells represents data from the prior sweep. Matrix 100, shown in FIG. 1A, is illustrated as a two-dimensional rectangle separated into a pair of two-dimensional square subgrids 102a and 102b. However, matrix 100 may be of any shape and any number of dimensions as is appropriate given the context. For example, matrix 100 may be in the shape of a three-dimensional cylinder separated into twenty-five cylindrical subgrids 102 in order to simulate airflow through an example wind tunnel.

Matrix 100 is a logically contiguous data structure despite being represented in FIG. 1A as being separated between subgrids 102a and 102b (separation shown by a dashed line). In some examples, each subgrid 102 is sized so that all cells 104 of the respective subgrid 102 can be executed by the HPC system substantially simultaneously. During a sweep, the values of each cell 104 within each subgrid 102 are updated based on the values determined during the prior sweep (or based on the initial values if during the first sweep). The values that the update is based on are values of related cells 104 of matrix 100. In some examples, the related cells 104 are the cell to be updated and the surrounding cells. For example, an update of cell 104c is based on the previous values of cell 104c as well as cells 104d, 104b, 104a, and two unlabeled cells of subgrid 102a.

When updating the values of cells 104 within the interior of a subgrid 102, all of values the update is based on can be obtained from the values loaded into the local storages of the pool of processors.

However, when updating the values of cells 104 within the halo region of the subgrid 102, some of the values the update is based on cannot be obtained from the values loaded into the local storages of the pool of processors. Specifically, values from surrounding cells located in another subgrid 102 are not loaded into the local storages. In order to obtain the values from those surrounding cells 104, mailboxes 106 are established in the shared fabric memory, with each mailbox 106 addressed to a cell in a halo region of a subgrid 102. For example, cell 104c is in the halo region of subgrid 102a. Mailbox 106a is addressed to cell 104c (as shown by the thick dashed line between cell 104c and mailbox 106a). Similarly, Mailbox 106b is addressed to cell 104d of subgrid 102b. Only mailboxes 106a and 106b are shown in FIGS. 1A-1F for the purpose of clarity. In an example implementation of a HPC system consistent with this disclosure, each cell 104 in a halo region of a subgrid 102 would be associated with a mailbox 106 addressed to the cell 104.

Mailboxes 106a and 106b contain packages 108. Packages 108 contain values of surrounding cells 104 of the cell 104 that the mailbox 106 is addressed to. For example, mailbox 106a, which is addressed to cell 104c, contains a package 108 that includes values "B" and "D" from surrounding cells 104b and 104d, respectively. In some examples, the value from each surrounding cell 104 stored within the mailbox 106 is stored in a package 108. In some other examples, all values for a certain sweep are stored in a single package 108. In yet some other examples, values from the surrounding cells 104 are stored in packages 108 based on their respective subgrids 102. Mailboxes 106a and 106b also contain metadata 110. In some examples, metadata 110 is a manifest of the packages 108 in the mailbox 106.

As shown in FIG. 1A, values of cells are stored in the appropriate mailboxes. For example, cells 104a and 104c are surrounding cells of cell 104d and are located on a different subgrid (subgrid 102a) than cell 104d (subgrid 102b). This means that cell 104d is located in the halo region of subgrid 102b, and that cell 104d has an associated mailbox 106b. The mailbox 106b, addressed to cell 104d, contains the values from cells 104a and 104c ("A" and "C", respectively) in a package 108 that is tracked in metadata 110. When updating the value of cell 104d, values "A" and "C" are retrieved from mailbox 106b, value "B" is retrieved from a local storage updating cell 104b, and value "D" is retrieved from the local storage updating the value of cell 104d. In certain examples, the values from cells 104a and 104c are passed to mailbox 106b by encapsulating the values in a data structure (i.e. package 108) and executing an algorithm that supplies the data structure to mailbox 106b as well as updates the metadata 110 of mailbox 106b to reflect the addition of the package 108. In some examples, package 108 is sent to a transfer location where a mailbox service routes package 108 to mailbox 106b.

FIG. 1B illustrates the update of a cell of matrix 100. Subgrid 102a is loaded into local storages for updating. Cell 104c is updated using local storage 112 and process 114. Process 114 is run on a processor of a pool of processors of the HPC system. Local storage 112 includes value "A" from cell 104a, which is another cell of subgrid 102a updated substantially simultaneously to cell 104c. In some examples, value "A" is passed to local storage 112 from another local storage coupled to a processor updating cell 104a. In some other examples, process 114 accesses the local storage coupled to the processor updating cell 104a and retrieves value "A". In yet other examples, both the local storage coupled to the processor updating cell 104a and local storage 112 retrieve value "A".

Local storage 112 also includes value "C" from cell 104c. Value "C" is the value of cell 104c from a previous sweep of a stencil code (or an initial value of cell 104c in the case where the current sweep is the first sweep). In some examples, local storage 112 retrieves value "C" from the shared fabric memory. In some other examples, all of the values of subgrid 102a are retrieved from the shared fabric memory and then each value is assigned into the appropriate local storage (e.g. value "C" to local storage 112) after being retrieved from the shared fabric memory.

Local storage 112 further includes values "B" and "D" from cells 104b and 104d, respectively. These values are retrieved from package 108 in mailbox 106a, which is addressed to cell 104c. In some examples, a mailbox service, upon receiving a request for packages from a certain sweep (in this case, the previous sweep), inspects metadata 110 to determine which packages 108 should be forwarded to local storage 112. For example, metadata 110 points to package 108 as a package containing values from the previous sweep, and since package 108 is contained in mailbox 106a, which is addressed to cell 104c, package 108 is known to contain prior sweep values from surrounding cells of cell 104c.

Process 114 accesses the values stored in local storage 112 and executes a set of instructions to determine the new value for the current sweep for cell 104c. In some examples, the new value for cell 104c is the arithmetic mean of the values in local storage 112. However, the new value for each cell may be calculated any way appropriate for the application. Process 114 determines a new value C' (quotes omitted to avoid confusion).

Figure 1C:
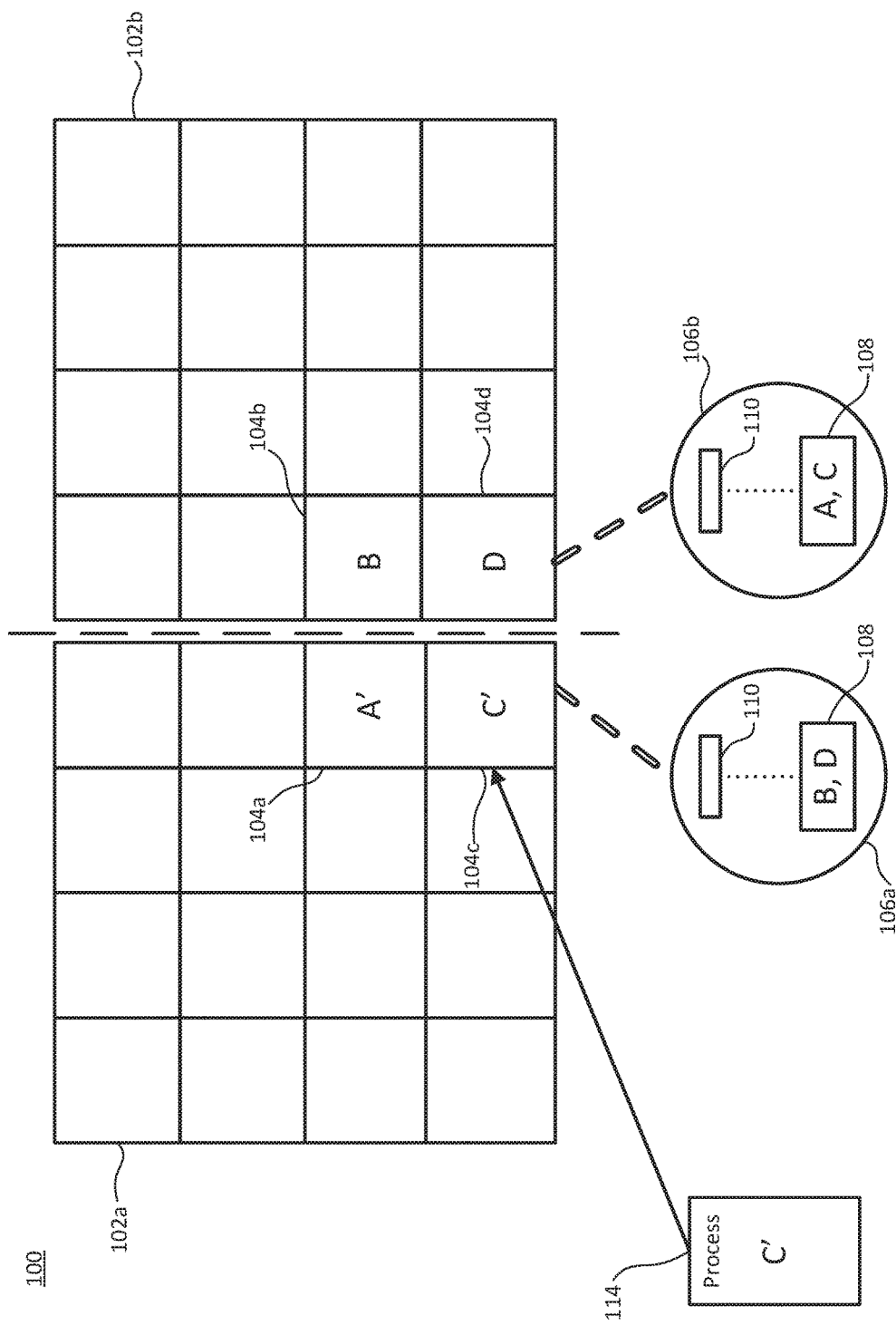

In FIG. 1C, subgrid 102a is updated to reflect the values of the current sweep. In some examples, multiple sweeps are iterated through before the values are written to the shared fabric memory. For example, sweep 1 is written to memory and then the next time values are written to memory is during sweep 5. In some examples, even when values are written only after multiple sweeps, values from all of the sweeps are written to the shared fabric memory.

In an example HPC system, the updates to the subgrid are aggregated into a data structure to be written to the shared fabric memory. Then, the updated values of the entire subgrid are written to the shared fabric memory in one transaction. In some other examples, process 114 writes its value to a location in the shared fabric memory corresponding to cell 104c and the current sweep.

In FIG. 1D, mailbox 106b is updated with new values for cells 104a and 104c from the current sweep. In some examples, this update of mailbox 106b occurs during the update of subgrid 102a. In some other examples, this update of mailbox 106b occurs after the update of subgrid 102a and before the update of subgrid 102b. In yet other examples, this update of mailbox 106b occurs after the update of subgrid 102a and subgrid 102b to the current sweep, during execution of instructions that are executed between sweeps. In such examples, a current sweep indicator is incremented as part of the executed instructions, and the stencil code prepares to update matrix 100 to the next sweep.

Package 108b, containing the new values from cells 104a and 104c, is included in mailbox 106b. Metadata 110 is altered to indicate that values from the previous sweep (package 108a) and values from the current sweep (package 108b) are in mailbox 106b.

Figure 1E:
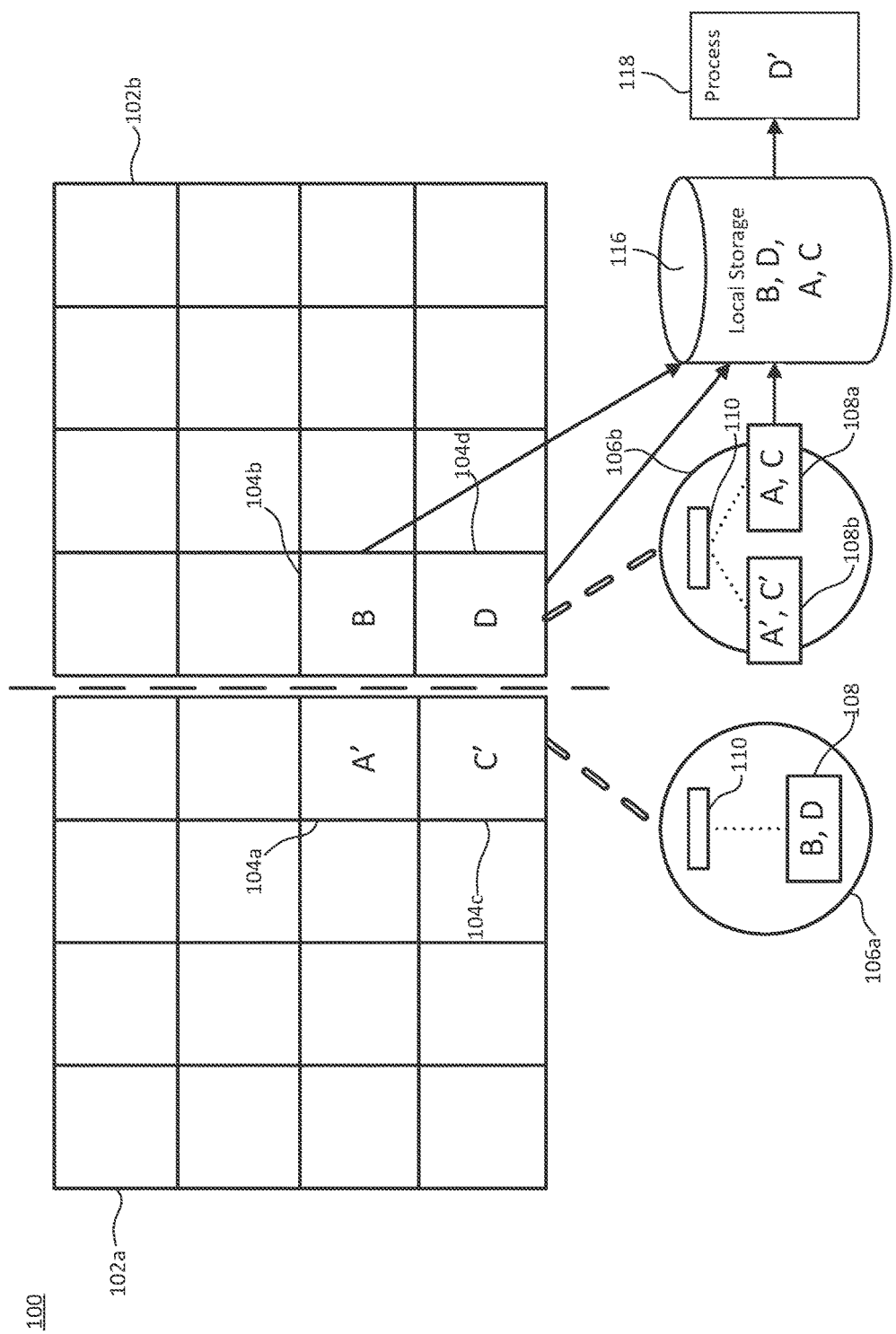

In FIG. 1E, cell 104d of subgrid 102b of matrix 100 is updated. Subgrid 102b is loaded into local storages for updating. Cell 104d is updated using local storage 116 and process 118. Process 118 is run on a processor of a pool of processors of the HPC system. Local storage 116 includes value "B" from cell 104b, which is another cell of subgrid 102b updated substantially simultaneously to cell 104d. In some examples, value "B" is passed to local storage 116 from another local storage coupled to a processor updating cell 104b. In some other examples, process 118 accesses the local storage coupled to the processor updating cell 104b and retrieves value "B". In yet other examples, both the local storage coupled to the processor updating cell 104b and local storage 116 retrieve value "B".

Local storage 116 also includes value "D" from cell 104d. Value "D" is the value of cell 104d from a previous sweep of a stencil code (or an initial value of cell 104d in the case where the current sweep is the first sweep). In some examples, local storage 116 retrieves value "D" from the shared fabric memory. In some other examples, all of the values of subgrid 102b are retrieved from the shared fabric memory and then each value is assigned into the appropriate local storage (e.g. value "D" to local storage 116) after being retrieved from the shared fabric memory.

Local storage 116 further includes values "A" and "C" from cells 104a and 104c, respectively. These values are retrieved from package 108a in mailbox 106b, which is addressed to cell 104d. In some examples, a mailbox service, upon receiving a request for packages from a certain sweep (in this case, the previous sweep), inspects metadata 110 to determine which packages 108 should be forwarded to local storage 116. For example, metadata 110 points to package 108a as a package containing values from the previous sweep, and since package 108a is contained in mailbox 106b, which is addressed to cell 104d, package 108a is known to contain prior sweep values from surrounding cells of cell 104d.

Process 118 accesses the values stored in local storage 116 and executes a set of instructions to determine the new value for the current sweep for cell 104d. In some examples, the new value for cell 104d is the arithmetic mean of the values in local storage 116. However, the new value for each cell may be calculated any way appropriate for the application. Process 118 determines a new value D' (quotes omitted to avoid confusion).

In some examples, once package 108a is loaded into local storage 116, package 108a is removed from mailbox 106b, and reference to package 108a is removed from metadata 110. This removal of package 108a after use can occur at any time during execution of the current sweep, or in between sweeps.

In FIG. 1F, subgrid 102b is updated to reflect the values of the current sweep. In some examples, multiple sweeps are iterated through before the values are written to the shared fabric memory. For example, sweep 1 is written to memory and then the next time values are written to memory is during sweep 5. In some examples, even when values are written only after multiple sweeps, values from all of the sweeps are written to the shared fabric memory.

In an example HPC system, the updates to the subgrid are aggregated into a data structure to be written to the shared fabric memory. Then, the updated values of the entire subgrid are written to the shared fabric memory in one transaction. In some other examples, process 118 writes its value to a location in the shared fabric memory corresponding to cell 104d and the current sweep.

Figure 2A:
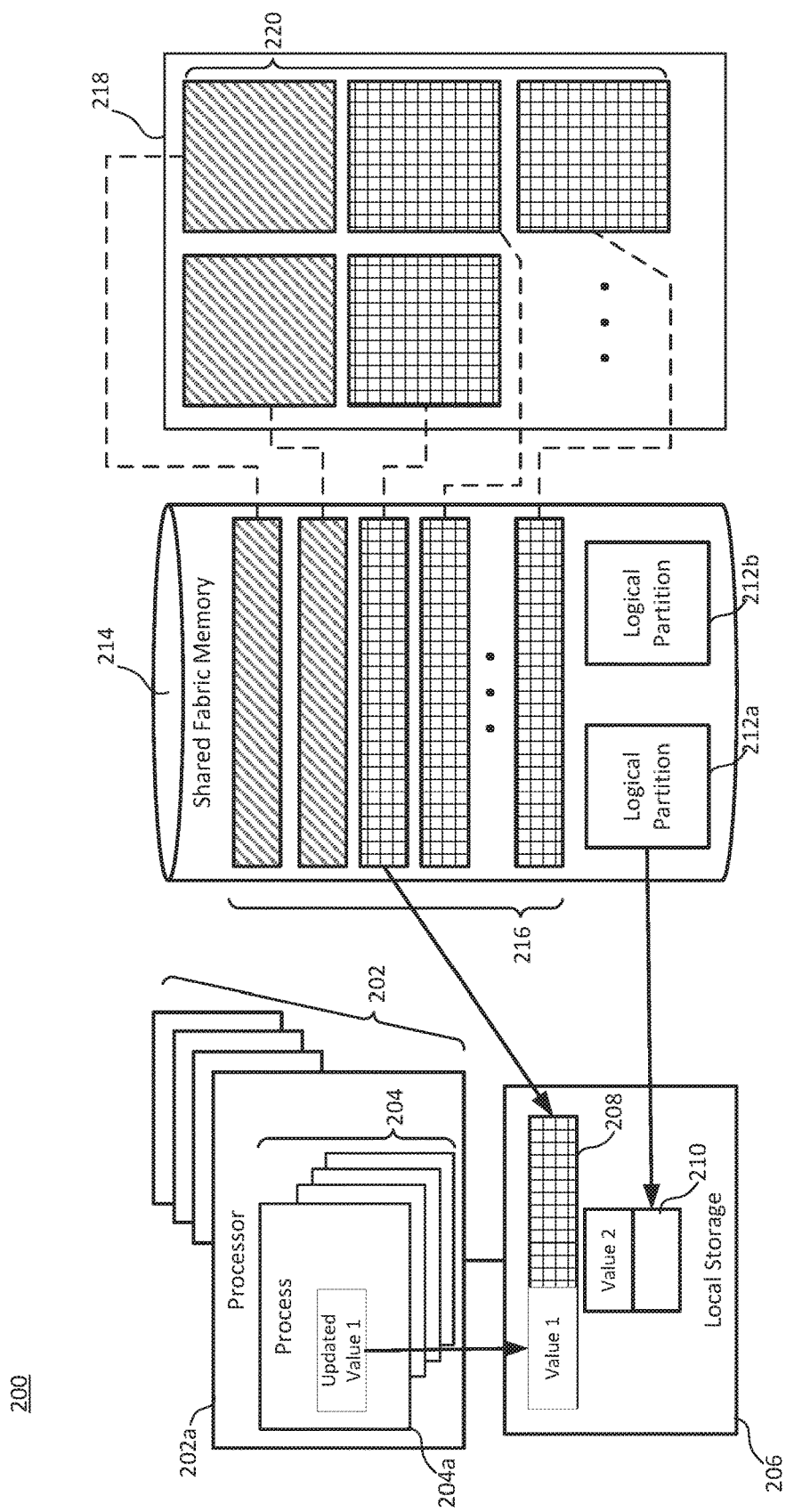
FIGS. 2A-2B illustrate an example HPC system updating values in a matrix of cells.
Figure 2B:
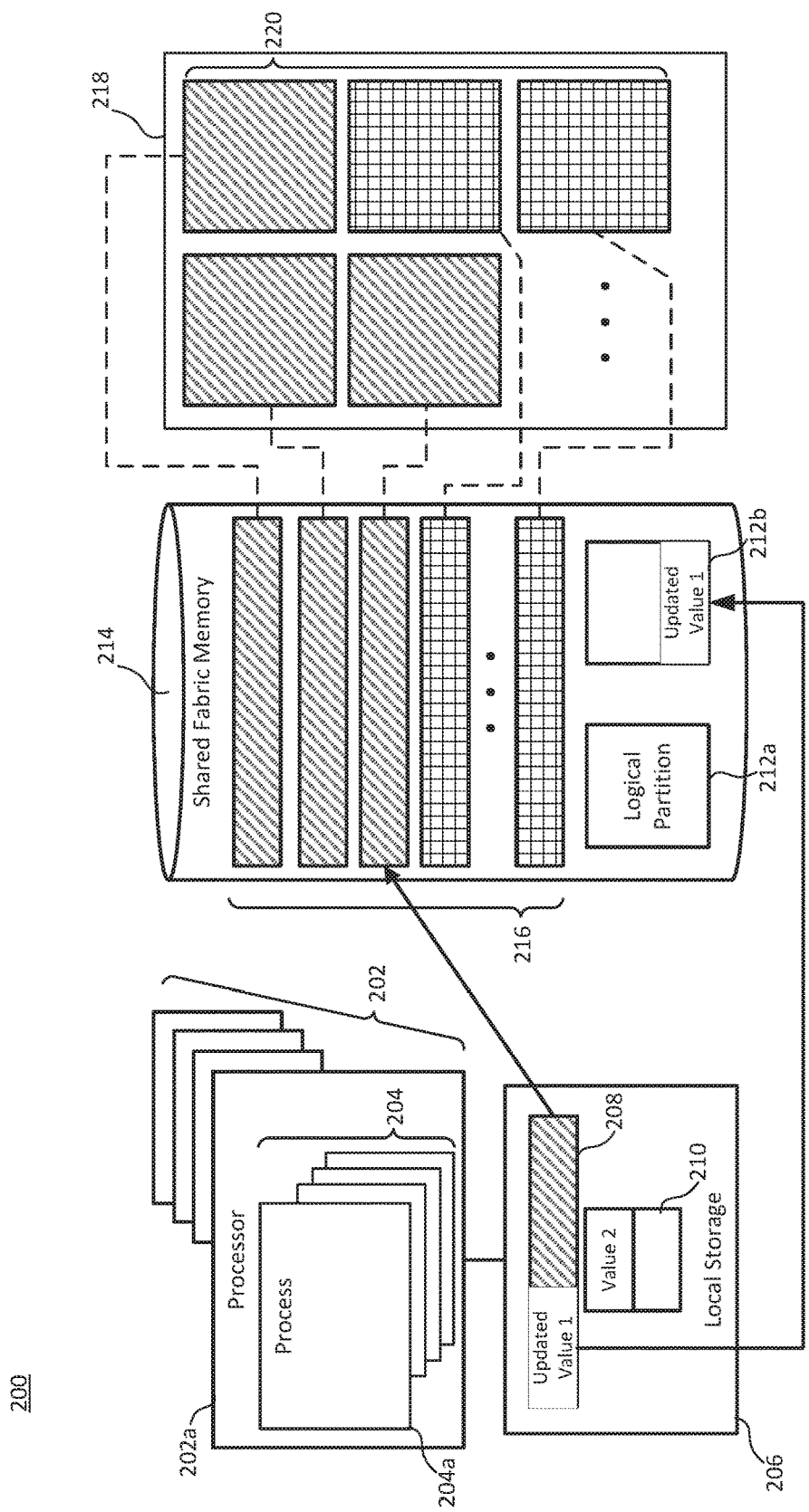

FIGS. 2A-2B illustrate an example HPC system executing a stencil code to update values of cells within a matrix.

FIG. 2A illustrates the example HPC system 200 updating a value of a cell of the matrix. HPC system 200 includes a pool of processors 202, including a first processor 202a. In some examples, each processor 202 executes at least one process 204, including a first process 204a. In the examples of FIGS. 2A-2B, operations are shown relative to processor 202a, process 204a, and local storage 206.

Local storage 206 is coupled to processor 202a. In some examples, local storage 206 is coupled to processor 202a, such that no other processor 202 has access to local storage 206. In some other examples, portions of local storage 206 are coupled to processor 202a and other portions of local storage 206 are shared between multiple processors 202. In yet other examples, portions of local storage 206 are coupled to process 204a.

Local storage 206 includes first data 208 and package 210. First data 208 includes values of cells from the subgrid currently being updated. In some examples, first data 208 includes all of the values of the current subgrid. In some other examples, first data 208 includes a portion of the values of the current subgrid, and other data are stored in other local storages to be updated by other processors 202.

First data 208 contains Value 1, a value from the prior sweep of the stencil code for a cell of the current subgrid. Value 1 is updated by process 204a to the current sweep. The current sweep is represented in FIGS. 2A-2B as a diagonal stripe fill, whereas the previous sweep is represented as a cross-hatch fill. First data 208 is supplied from shared fabric memory 214, which includes stripes 216. Each stripe 216 includes values of cells of a subgrid 220 of matrix 218. In FIGS. 2A-2B, the detailed workings of shared fabric memory 214 are not described, as they are outside the scope of this disclosure. Also, in FIGS. 2A-2B, matrix 218 is shown to highlight the correlation between stripes 216 and subgrids 220.

Package 210 includes values from logical partition 212a (also called a mailbox). These values are from related cells to the cell being updated by process 204a. In some examples, the value from each related cell stored within logical partition 212a is stored in a package 210. In some other examples, all values for a certain sweep of the stencil code are stored in a single package 210. In yet some other examples, values from the related cells are stored in packages 210 based on their respective subgrids. In certain examples, the related cells are the cells surrounding the cell being updated. Process 204a uses Value 2 from package 210 along with Value 1 and other values to determine Updated Value 1 for the cell to be updated. Logical partition 212a is addressed to the cell to be updated. Logical partition 212b is not addressed to the cell to be updated.

Matrix 218 illustrates that the stencil code is in the middle of a sweep. This is shown by the fact that the top two subgrids 220 are updated to the current sweep, and the rest of the subgrids 220 are still at the previous sweep. This is further illustrated in the status of shared memory fabric 214, where the top two stripes 216 are updated to the current sweep and the rest of the stripes 216 are still at the previous sweep. Further still, Process 204a is shown as updating Value 1 in first data 208, which is represented as still being at the previous sweep in FIG. 2A. As will be shown in FIG. 2B, first data 208 will update to the current sweep upon the updated Value 1 replacing the previous Value 1.

FIG. 2B shows HPC system 200 updating the subgrid now that Value 1 has been updated. Since process 204a has written Updated Value 1 into first data 208, first data 208 is updated to the current sweep. Updated Value 1 is also written to logical partition 212b as a package, indicating that the cell updated by process 204a is a related cell to the cell that logical partition 212b is addressed to. Further, the cell updated by process 204a is not on the same subgrid as the cell that logical partition 212b is addressed to.

Updated first data 208 is loaded into the appropriate stripe 216. Although, for clarity's sake, first data 208 is shown being loaded into the same stripe 216 as it was pulled from in FIG. 2A, first data 208 may be loaded into any appropriate stripe 216 in shared fabric memory 214. In some examples, first data 208 is combined with other data that was updated by other processes 204 and processors 202 to create an updated stripe 216 representing the subgrid 220. In some such cases, the combined data may be held in a temporary location prior to being loaded into the appropriate location on shared fabric memory 214. In some other such cases, each processor 202 loads its respective data 208 into the appropriate location for that data on the appropriate stripe 216 of shared fabric memory 214. In some examples, multiple sweeps of the current subgrid are executed prior to writing the data to shared fabric memory 214, and thus multiple stripes 216 of data are written to the shared fabric memory 214 substantially simultaneously.

Figure 3:
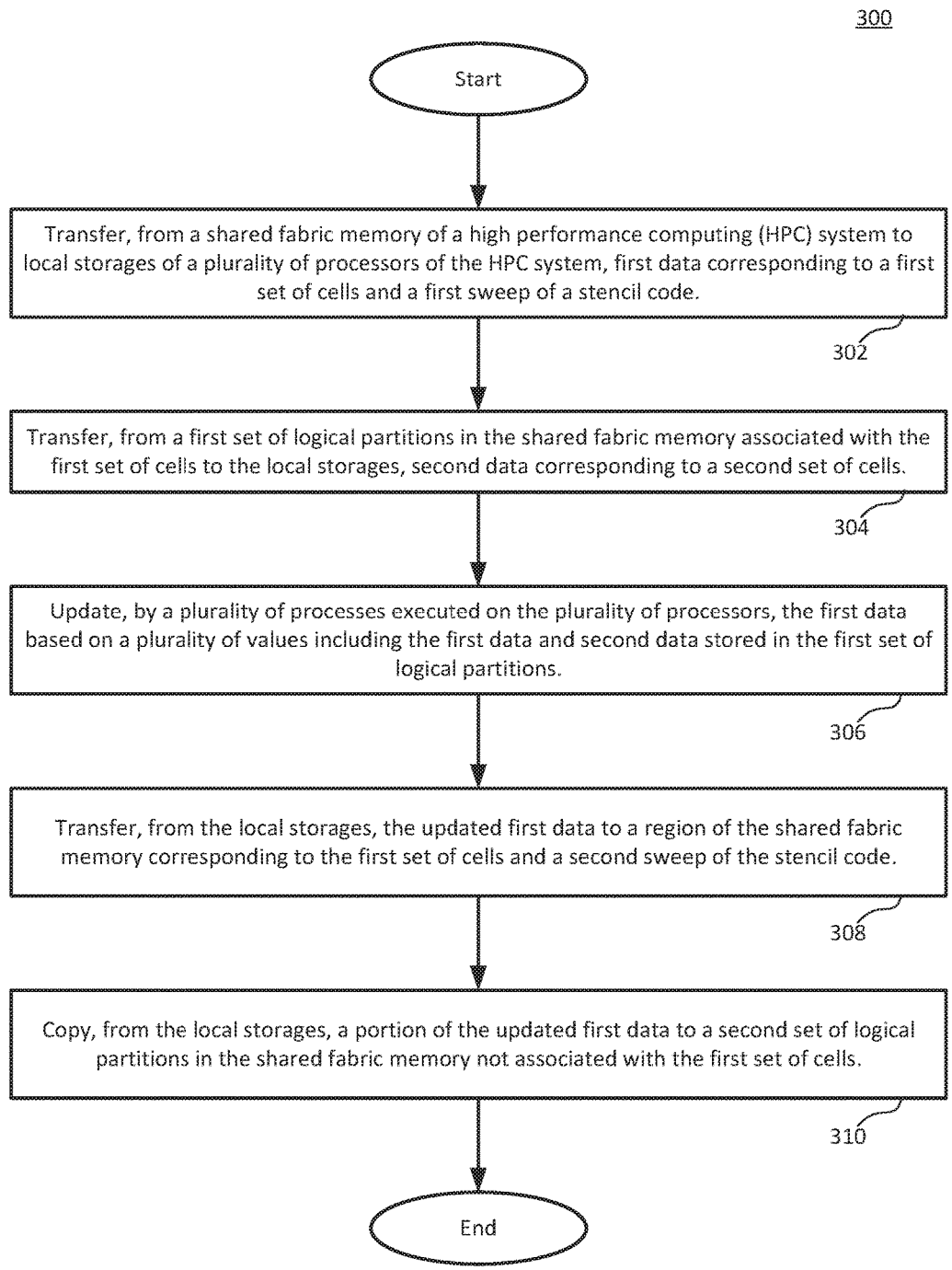
FIG. 3 is a flowchart illustrating an example method for updating data of certain cells of a matrix.

FIG. 3 is a flowchart illustrating an example method for updating a portion of a matrix of a stencil code by a HPC system.

Step 302 describes transferring first data from the shared fabric memory to at least one local storage coupled to the pool of processors of the HPC system. In some examples, a local storage is coupled to a single processor, meaning that no other processor has access to that local storage. In some other examples, portions of the local storage are coupled to the processor and other portions of the local storage are shared between multiple processors. In yet other examples, portions of the local storage are coupled to a single process executing on the processor.

The first data corresponds to a first set of cells and a first sweep of a stencil code. The stencil code sequentially updates values stored in cells in iterations called sweeps. Since the dataset containing all of the cells (called the "matrix") may be larger than could be updated by the HPC system substantially simultaneously, the dataset is split into subgrids. Each subgrid is small enough to be updated by the HPC system substantially simultaneously.

Step 304 describes transferring second data from a first set of logical partitions in the shared fabric memory to the local storages. The second data are additional values of cells that are not located on the current subgrid of cells (the first set of cells). However, these cells whose values are contained in the second data are related cells when updating certain cells in the first set of cells. In some examples, a cell's related cells are the cells that immediately surround the cell. If the cell is located near the edge of a subgrid (called the halo region), some of the immediately surrounding cells may be located on another subgrid of cells. Since the first data, having values of cells in the first set of cells, does not include values from other subgrids, the second data supplies the values of the immediately surrounding cells that are not located on the first set of cells. This second data is stored in logical partitions (called "mailboxes") on the shared fabric memory. Each logical partition in the first set of logical partitions is addressed to a respective cell of halo region of the first set of cells. The values in each of the first set of logical partitions are the values of the related cells to the cell of the first set of cells that the logical partition is addressed to.

In some examples, the second data corresponds to a single subgrid (the second set of cells). In some other examples, the second data corresponds to all subgrids (the second set of cells) except the current subgrid.

Step 306 describes updating the first data based on a group of values that includes the current first data, and the second data. In some examples, each value in the first data is updated using a respective group of values assembled from the first data and the second data. In certain examples, each value of the first data is updated to the current sweep (a second sweep) by executing instructions to determine the value based on the value at the prior sweep (the first sweep) and based on the related cells' values at the prior sweep. In some examples, values from multiple prior sweeps are used to calculate the updated cell value.

Step 308 describes transferring the updated first data from the local storages to a region of the shared fabric memory corresponding to the first set of cells and a second sweep of the stencil code. In some examples, the region corresponding to the first set of cells and the second sweep is different from the region corresponding to the first set of cells and the first sweep. In certain examples, the updated first data is assembled together in a data structure prior to being transferred to the region of the shared fabric memory. In some other examples, each processor of the HPC system transfers a portion of the updated first data to an appropriate location within the region of the shared fabric memory.

Step 310 describes copying a portion of the updated first data to a second set of logical partitions in the shared fabric memory. None of the second set of logical partitions are addressed to any of the first set of cells. This copying of the portion of the updated first data populates values in logical partitions addressed to cells that are not in the first set, but that have related cells that are in the first set of cells. For example, a cell in a first subgrid has its updated value copied to a logical partition addressed to a cell in a second subgrid because the cell in the first subgrid is a related cell (e.g. immediately surrounding) to the cell in the second subgrid. Thus, when the second subgrid is updated to a certain sweep, the value from the cell in the first subgrid that is used to update the cell in the second subgrid is held in the logical partition until used.

Figure 4:
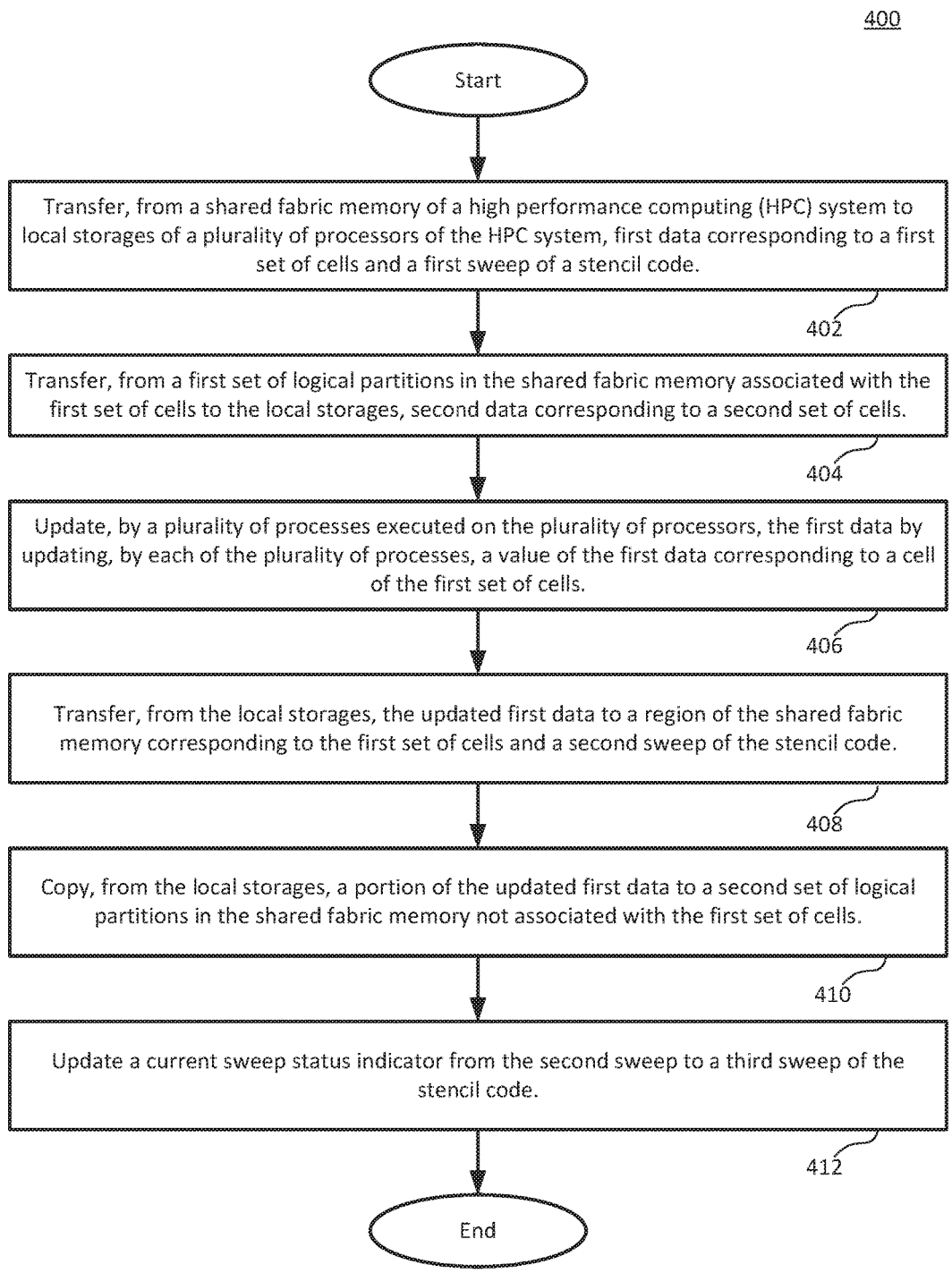
FIG. 4 is a flowchart illustrating another example method for updating data of certain cells of a matrix.

FIG. 4 is a flowchart illustrating another example method for updating a portion of a matrix of a stencil code by a HPC system.

Step 402 describes transferring first data from the shared fabric memory to at least one local storage coupled to the pool of processors of the HPC system. In some examples, a local storage is coupled to a single processor, meaning that no other processor has access to that local storage. In some other examples, portions of the local storage are coupled to the processor and other portions of the local storage are shared between multiple processors. In yet other examples, portions of the local storage are coupled to a single process executing on the processor.

The first data corresponds to a first set of cells and a first sweep of a stencil code. The stencil code sequentially updates values stored in cells in iterations called sweeps. Since the dataset containing all of the cells (called the "matrix") may be larger than could be updated by the HPC system substantially simultaneously, the dataset is split into subgrids. Each subgrid is small enough to be updated by the HPC system substantially simultaneously.

Step 404 describes transferring second data from a first set of logical partitions in the shared fabric memory to the local storages. The second data are additional values of cells that are not located on the current subgrid of cells (the first set of cells). However, these cells whose values are contained in the second data are related cells when updating certain cells in the first set of cells. In some examples, a cell's related cells are the cells that immediately surround the cell. If the cell is located near the edge of a subgrid (called the halo region), some of the immediately surrounding cells may be located on another subgrid of cells. Since the first data, having values of cells in the first set of cells, does not include values from other subgrids, the second data supplies the values of the immediately surrounding cells that are not located on the first set of cells. This second data is stored in logical partitions (called "mailboxes") on the shared fabric memory. Each logical partition in the first set of logical partitions is addressed to a respective cell in the halo region of the first set of cells. The values in each of the first set of logical partitions are the values of the related cells to the cell of the first set of cells that the logical partition is addressed to.

In some examples, the second data corresponds to a single subgrid (the second set of cells). In some other examples, the second data corresponds to all subgrids (the second set of cells) except the current subgrid.

Step 406 describes updating the first data based on a group of values that includes the current first data, and the second data. In some examples, each value in the first data is updated using a respective group of values assembled from the first data and the second data. In certain examples, each value of the first data is updated to the current sweep (a second sweep) by executing instructions to determine the value based on the value at the prior sweep (the first sweep) and based on the related cells' values at the prior sweep. In some examples, values from multiple prior sweeps are used to calculate the updated cell value.

Step 408 describes transferring the updated first data from the local storages to a region of the shared fabric memory corresponding to the first set of cells and a second sweep of the stencil code. In some examples, the region corresponding to the first set of cells and the second sweep is different from the region corresponding to the first set of cells and the first sweep. In certain examples, the updated first data is assembled together in a data structure prior to being transferred to the region of the shared fabric memory. In some other examples, each processor of the HPC system transfers a portion of the updated first data to an appropriate location within the region of the shared fabric memory.

Step 410 describes copying a portion of the updated first data to a second set of logical partitions in the shared fabric memory. None of the second set of logical partitions are addressed to any of the first set of cells. This copying of the portion of the updated first data populates values in logical partitions addressed to cells that are not in the first set, but that have related cells that are in the first set of cells. For example, a cell in a first subgrid has its updated value copied to a logical partition addressed to a cell in a second subgrid because the cell in the first subgrid is a related cell (e.g. immediately surrounding) to the cell in the second subgrid. Thus, when the second subgrid is updated to a certain sweep, the value from the cell in the first subgrid that is used to update the cell in the second subgrid is held in the logical partition until used.

Step 412 describes updating a current sweep status indicator from indicating the second sweep to indicating a third sweep of the stencil code. Once all subgrids of the matrix have been updated to the current sweep, the current sweep status indicator is incremented, indicating that the current sweep (the second sweep) has finished and that the next sweep (the third sweep) to be executed will begin once inter-sweep instructions are executed. Inter-sweep instructions may remove temporary data used for the prior sweep, perform backup and other resiliency operations, output data, or perform any other task appropriate to be executed during the inter-sweep time period. Once the inter-sweep instructions are finished executing, the next sweep begins to execute.

Although the present disclosure has been described in detail, it should be understood that various changes, substitutions and alterations can be made without departing from the spirit and scope of the disclosure. Any use of the words "may" or "can" in respect to features of the disclosure indicates that certain embodiments include the feature and certain other embodiments do not include the feature, as is appropriate given the context. Any use of the words "or" and "and" in respect to features of the disclosure indicates that embodiments can contain any combination of the listed features, as is appropriate given the context.

Phrases and parentheticals beginning with "e.g." and "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A high performance computing (HPC) system, comprising:
   a shared fabric memory; and
   a first processor of a plurality of processors,
   the first processor coupled to a local storage, and
   the first processor executing a first process that, in combination with other processes, causes the plurality of processors to:
      transfer, from the shared fabric memory to the local storage, a first value corresponding to a first cell of a first sub-grid and a first sweep of a stencil code,
      transfer, from a first logical partition in the shared fabric memory associated with the first cell to the local storage, a second value corresponding to a second cell of a second sub-grid of the shared fabric memory, wherein the first sub-grid abuts the second sub-grid, and wherein the first logical partition is separate from the second sub-grid; and
      update, by the first process, the first value based on a plurality of values comprising:
         the first value; and
         the second value.

2. The HPC system of claim 1, wherein executing the first process in combination with other processes further causes the plurality of processors to store a copy of the updated first value in a second logical partition in the shared fabric memory associated with the second cell, wherein the second logical partition is separate from the first sub-grid.

3. The HPC system of claim 1, wherein the plurality of values further comprises a third value corresponding to a third cell related to the first cell and in the first set of cells.

4. The HPC system of claim 1, wherein the updated first value corresponds to a second sweep of the stencil code.

5. The HPC system of claim 4, wherein executing the first process in combination with other processes further causes the plurality of processors to, upon updating the first value, update a current sweep status indicator from the second sweep to a third sweep.

6. The HPC system of claim 4, wherein a plurality of values corresponding to cells of the first sub-grid are updated simultaneously with the first value.

7. A method, comprising:
   transferring, from a shared fabric memory of a high performance computing (HPC) system to local storages of a plurality of processors of the HPC system, first data corresponding to a first sub-grid of cells and a first sweep of a stencil code;
   transferring, from a first set of logical partitions in the shared fabric memory associated with the first sub-grid of cells to the local storages, second data corresponding to a second sub-grid of cells, wherein the first sub-grid abuts the second sub-grid, and wherein the first set of logical partitions is separate from the second sub-grid;
   updating, by a plurality of processes executed on the plurality of processors, the first data based on a plurality of values comprising:
      the first data; and
      second data stored in the first set of logical partitions;
   transferring, from the local storages, the updated first data to a region of the shared fabric memory corresponding to the first sub-grid of cells and a second sweep of the stencil code; and
   copying, from the local storages, a portion of the updated first data to a second set of logical partitions in the shared fabric memory not associated with the first sub-grid of cells.

8. The method of claim 7, wherein each of the plurality of processes updates a single value of the first data, a value of the first data corresponding to a cell of the first sub-grid of cells.

9. The method of claim 7, further comprising updating a current sweep status indicator from the second sweep to a third sweep of the stencil code.

10. The method of claim 7, wherein each of the first set of logical partitions corresponds to a cell of the first sub-grid of cells and each of the second set of logical partitions corresponds to a cell not in the first sub-grid of cells.

11. The method of claim 10, wherein each of the cells with a corresponding logical partition of the second set of logical partitions is related to a cell of the first sub-grid of cells.

12. The method of claim 7, wherein the first set of logical partitions and the second set of logical partitions are protected from process failure and memory device failure.

13. A high performance computing (HPC) system, comprising:
   a shared fabric memory; and
   a plurality of processors,
   each processor of the plurality of processors coupled to a respective local storage, and
   each processor executing a respective process that, in combination with other processes, causes the plurality of processors to:
      transfer, from the shared fabric memory to the respective local storages, first data corresponding to a first subgrid and a first sweep of a stencil code,
      transfer, from a first set of logical partitions in the shared fabric memory associated with the first sub-grid to the respective local storages, second data corresponding to a second sub-grid of the shared fabric memory, wherein the first sub-grid abuts the second sub-grid, and wherein the first set of logical partitions is separate from the second sub-grid; and update, by each respective process, a value of the first data based on a plurality of values comprising:
the value of the first data; and
a portion of the second data.

14. The HPC system of claim 13, wherein each value of the first data represents a cell of the first subgrid.

15. The HPC system of claim 13, wherein each updated value of the first data corresponds to a second sweep of the stencil code.

16. The HPC system of claim 13, wherein executing each respective process in combination with other processes further causes the plurality of processors to, upon updating the value of the first data, update a current sweep status indicator from the second sweep to a third sweep.

17. The HPC system of claim 13, wherein each value of the first data is updated simultaneously.

18. The HPC system of claim 13, wherein the second subgrid comprises cells related to the first subgrid.

19. The HPC system of claim 13, wherein executing each respective process in combination with other processes further causes the plurality of processors to store a copy of each updated value of the first data in a second set of logical partitions in the shared fabric memory associated with the second subgrid.

20. The HPC system of claim 19, wherein each of the second set of logical partitions receives a copy of at least one updated value of the first data.

* * * * *